UNITED STATES PATENT OFFICE.

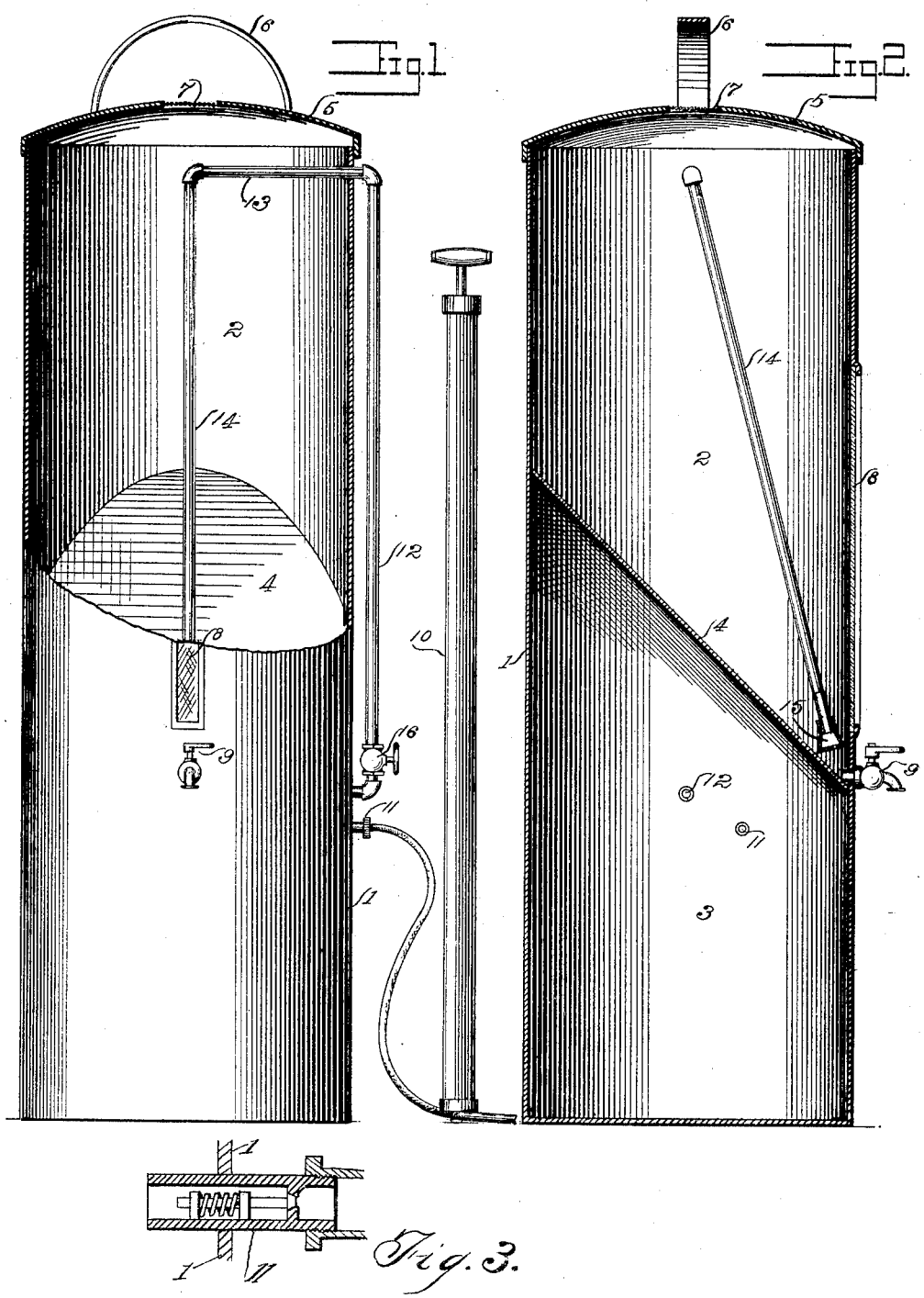

JAMES L. ROBERTS, OF PONTIAC, ILLINOIS.

CREAM-SEPARATOR.

SPECIFICATION forming part of Letters Patent No. 679,685, dated July 30, 1901.

Application filed August 14, 1900. Serial No. 26,876. (No model.)

*To all whom it may concern:*

Be it known that I, JAMES L. ROBERTS, a citizen of the United States, residing at Pontiac, in the county of Livingston and State of Illinois, have invented a new and useful Cream-Separator, of which the following is a specification.

This invention relates to cream-separators of that class which employs a cream-separating fluid that is introduced into a volume of milk so as to cause the cream to rise to the surface thereof; and the objects of the invention are to provide for introducing the cream-separating fluid with the slightest possible agitation to the milk and to maintain a continuous flow of the fluid, which is also controllable, so as to be regulated according to the requirements of any particular case.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a side elevation, partly in section, of a cream-separator constructed and arranged in accordance with the present invention. Fig. 2 is a vertical central sectional view taken at right angles to Fig. 1. Fig. 3 is a detail sectional view illustrating the check-valve connection between the air-pump and the compressed-air tank.

Corresponding parts are designated by like characters of reference in all the figures of the drawings.

Referring to the drawings, 1 designates a can or receptacle forming the body of the device, which is divided into an upper chamber 2 and a lower chamber 3 by means of an inclined partition 4. The open upper end of the upper or milk-containing chamber is provided with a cover 5, having a handle 6 and a screen-covered ventilating-opening 7 for the escape of the animal heat of the milk. In one side of the upper chamber there is provided a transparently-covered longitudinal slot 8, which terminates just above the lowermost portion of the bottom of the upper chamber. Immediately below this slot there is provided a cock or faucet 9 for drawing off the liquid contents of the upper chamber from the bottom thereof, so as not to agitate the cream upon the surface of the milk. The bottom chamber is made air-tight, so as to form a compressed-air tank, which is supplied with air by means of a suitable hand-operated pump 10, removably connected to a check-valve 11, provided in one wall of the chamber in the manner of an ordinary bicycle-pump. An upright air pipe or tube 12 leads from the air-tank to the upper portion of the milk-chamber and upon the exterior of the device. At the upper end of this pipe there is a lateral branch pipe 13, which passes into the milk-chamber and extends to about the middle thereof, and from this pipe there extends a pendent laterally-inclined pipe 14, which terminates adjacent to the discharge-opening formed by the faucet and is provided with a spray-nozzle 15.

In the operation of the device the air-tank is supplied with compressed air by means of the pump, and the milk-chamber is charged with milk, after which air is supplied to the bottom of the milk by means of the controlling-valve 16, preferably carried by the external pipe 12. Thus the cream-separating agent or fluid is applied directly at the bottom of the milk, so that it may rise gradually therethrough without agitating the whole volume of milk to any considerable extent, thereby hastening the separation of the cream from the milk. Also by means of the valve the air may be controlled, so as to increase or decrease the supply or air, according to the requirements of any particular case.

In supplying the cream-separating agent to the milk it is essential that such agent may agitate the milk as little as possible, and to accomplish this object I have placed the separating agent or air under pressure and arranged the same so that it may be supplied in a continuous uninterrupted flow to the bottom of the milk, thereby causing the least possible agitation of the milk. Also I have the supply of air under control, so that it may be applied in large or small quantities, as may be required.

When the cream has become separated from the milk and collected upon the surface, as may be seen through the glass-covered slot, the supply of air is stopped by means of the valve and the milk is drawn off through the faucet, and the cream finally drawn off into a separate receptacle in the usual manner.

It will be observed that the milk-receptacle is located above the compressed-air tank, so as to facilitate the drawing off of the cream and milk, and that the air-passage 12 passes into the milk-receptacle through or adjacent to the top thereof and discharges at or adjacent to its bottom. By this arrangement the milk can rise in the tube or pipe 14 only as high as the level within the receptacle, and as such level is never above the top of the pipe 14 it is impossible for the milk to escape through the external air-pipe 12 and into the compressed-air tank.

What is claimed is—

1. A cream-separator of the class described, comprising a receptacle, having an open upper end, an intermediate partition dividing the receptacle into an entirely-closed bottom compressed-air chamber, and an upper milk-chamber, a check-valve for the bottom chamber, a removable cover for the milk-chamber, said cover having a ventilating-opening, an air-passage communicating between the two chambers, and means for controlling the continuous and uninterrupted flow of air to the milk-chamber.

2. A cream-separator of the class described, comprising a receptacle, having a vertically-inclined partition dividing the receptacle into an upper milk-chamber, and a lower compressed-air chamber, a check-valve in one of the walls of the latter chamber, an external pipe communicating between the two chambers, a valve carried by the external pipe, means for drawing off the contents of the milk-chamber and located adjacent to the lowermost portion of the bottom thereof, and an internal pipe communicating with the external pipe, and discharging adjacent to the lowermost portion of the bottom of the milk-chamber.

In testimony that I claim the foregoing as my own I have hereto affixed my signature in the presence of two witnesses.

JAMES L. ROBERTS.

Witnesses:
   D. S. MYERS,
   A. R. LORD.